United States Patent [19]

Nighy

[11] 3,964,913

[45] June 22, 1976

[54] STAINLESS STEEL POLISH

[76] Inventor: Charles David Nighy, c/o Catercraft (Sussex) Ltd., 18 Old Mill Square, Storrington, Sussex, England

[22] Filed: Sept. 30, 1974

[21] Appl. No.: 510,158

Related U.S. Application Data

[63] Continuation-in-part of Ser. No. 390,559, Aug. 22, 1973, abandoned.

[52] U.S. Cl................................. 106/10; 106/271; 106/272; 252/164; 252/172
[51] Int. Cl.$^2$......................................... C09G 1/02
[58] Field of Search ................. 106/3, 10, 271, 272, 106/270; 252/131, 164, 173

[56] References Cited
UNITED STATES PATENTS

| | | |
|---|---|---|
| 2,344,671 | 3/1944 | Bertsch .................................. 106/3 |
| 3,345,295 | 10/1967 | Schwarez et al. ....................... 106/3 |
| 3,458,300 | 7/1969 | Duvall et al. ............................ 106/3 |
| 3,677,954 | 7/1972 | Nakajima et al. .................... 252/131 |

FOREIGN PATENTS OR APPLICATIONS 613,755   1/1961   Canada ................................ 106/10

Primary Examiner—Lorenzo B. Hayes

[57] ABSTRACT

A non-abrasive, non-toxic polish for stainless steels and the like in the form of an aqueous, paste-like emulsion containing alumina powder, a non-volatile aliphatic alcohol and a polyoxyethylated aliphatic base.

7 Claims, No Drawings

STAINLESS STEEL POLISH

This application is a continuation-in-part of Nighy application Ser. No. 390,559, filed Aug. 22, 1973, now abandoned.

This invention relates to fluid polishing compositions and in particular provides a non-abrasive, non-toxic paste for polishing austenitic and ferritic stainless steels and the like.

Stainless steel alloys are by nature resistant to staining. Some persistent forms of staining do occur which do not respond to normal remedial treatment. Considerable loss of natural luster can occur with both austenitic and ferritic stainless steels, thereby producing a loss of the attractive finish obtained by factory automatic polishing. Apart from architectural steel, metals used in trade and industry, particularly in the catering trades, can become lack luster as, for example, can be seen in the domestic kitchen stainless steel sink.

Generally the polishes for stainless steels which are available commercially heretofore are toxic, harshly abrasive and where they achieve enhanced surface finish, such achievement is of short lived nature.

It is, therefore, a principal object of this invention to provide a stainless steel polish which is non-toxic and relatively non-abrasive, and which will build upon its own surface enhancing luster with successive applications. It is also an object to provide such a polish which is warm water soluble to allow ease of removal of the polish.

These and other objects of the invention are generally obtained utilizing a polish which is water based and of paste-like consistency including a major proportion of solids and a minor proportion of water, the water being the major volatile component of the composition. The solid portion of the composition contains a major proportion of finely divided alumina powder which functions as a very mild abrasive. For this purpose alumina powder grade A.13 is the type of choice. In addition the solid portion of the composition includes a self-emulsifying wax, such as a polyoxyethylated aliphatic alcohol, and an aliphatic alcohol which acts as a deep cleansing agent for removing blemishes in combination with the alumina powder such that the self-emulsifying wax tends to seal the surface to impart lasting brilliance.

The self-emulsifying wax should be a polyoxyethylated aliphatic alcohol, in which the aliphatic alcohol has from approximately 12 to 20 carbon atoms and preferably is cetyl alcohol. Generally from 3 to 20 moles of polyoxyethylene should be condensed with one mole of the fatty alcohol in order to provide a waxy material. The aliphatic alcohol component of the composition similarly should have from 12 to 20 carbon atoms and preferably is cetyl alcohol.

In general the alumina powder can be from about 40 to about 50 parts by volume of the composition. The aliphatic alcohol can be from 7 to 20 parts and the polyoxyethylated alcohol can be from about 7 to 10 parts by volume. The balance of the composition should be water and the ingredients should be proportioned so that the quantity of water is between about 27 and 30 parts per 100 by volume. Paraffin wax can be substituted in part, up to 10 parts for the aliphatic alcohol component. Adjuvents, fillers and pigments can, of course, be included.

EXAMPLE 1

A polish in accordance with this invention was prepared which was paste-like in consistency and white in color by blending alumina powder grade A.13, cetyl alcohol, paraffin wax, Collone AC and water, using 44.0% by volume alumina, 8% by volume cetyl alcohol, 9.5% by volume paraffin wax and 8% by volume Collone AC, with 30.5% by volume water. (Collone AC is a proprietary product prepared by condensing six moles of ethylene oxide with one mole of cetyl alcohol and is waxy in consistency).

EXAMPLES 2 – 7

The polishing composition of Example 1 was tested on both austenitic and ferritic stainless steels to ascertain the removal of certain stains or films with the following results:

TABLE I

| Example | Stain of Film | Austenitic SS | Ferritic SS |
|---|---|---|---|
| 2 | Heavy oxide film (heat tint) | Effectively removed, bright surface produced | Effectively removed, bright surface produced |
| 3 | Matt surface finish (original state) | Brilliant surface - only after much polishing | Brilliant surface - only after much polishing |
| 4 | Rust | Not applicable | Light rust removed |
| 5 | Chloride film (attack of conc.HCl+ FeCl$_3$) | Removed - giving a matt finish (Etched) | Removed - giving a matt finish (Etched) |
| 6 | Tannin stain (Tea) | Easily removed | Easily removed |
| 7 | Resistance to water smearing (after use of polish | Good | Good |

Stainless steel alloys are resistant to stains and it was, therefore, a problem to simulate some naturally occurring stains under laboratory conditions. In particular in Example 2 above, a heavy oxide film was produced by heating the metal in a flame and in Example 5 above, a chloride film was produced by using ferric chloride crystals dissolved in concentrated hydrochloric acid to give a 50%–50% solution. After removal of the chloride film in Example 5, the procedure of Example 3 was necessary by way of further treatment.

EXAMPLE 8

The composition of Example 1 was utilized in comparison with a proprietary liquid polish as a control for ascertaining the abrasion produced. In the test two 18/8 stainless steel plates were set up in an automatic polisher and were polished at 70 strokes per minute, an equal amount of polish being used in each case. Tests of one and four hours were used. The results were as follows:

TABLE II

Polish

TABLE II-continued

One hour test
  Wt. lost by SS    Example 1 = 0.0117g
  Wt. lost by SS    Control   = 0.0082g
Four hour test
  Wt. lost be SS    Example 1 = 0.0195g
  Wt. lost by SS    Control   = 0.0164g Superior quality polish surfaces were produced utilizing the polish of Example 1.

EXAMPLE 9

A white, paste-like polish in accordance with this invention was prepared blending the following ingredients:

| Ingredients | Parts by Volume |
|---|---|
| Alumina Powder | 44 |
| Cetyl Alcohol | 17.5 |
| Collone AC | 8 |
| Water | 30.5 |

The polish of Example 9 generally is equivalent to the polish of Example 1 and is useful in removal of stains on stainless steel of the types referred to in Table I. The polishes of both Examples 1 and 9 are readily removed by washing with warm soapy water. Detergents should not be used as these are destructive to the surface of stainless steel. The stainless steel surface should then be polished with a dry cloth until the required brilliance is achieved.

EXAMPLES 10-18

The following Table III lists the components of several compositions in accordance with the invention, illustrating variation of components and of proportions:

Empilan KM4 is a proprietary product prepared by condensing 4 moles of ethylene oxide with 1 mole of a distillation cut of cetyl and stearyl alcohols.

Tergitol nonionic TMN is a proprietary product prepared by condensing 6 moles of ethylene oxide with 1 mole of trimethyl nonanol.

Empilan KM9 is a proprietary product prepared by condensing 9 moles of ethylene oxide with 1 mole of a distillation cut of cetyl and stearyl alcohols.

Eumulgin B2 is a proprietary product prepared by condensing 20 moles of ethylene oxide with 1 mole of a distillation cut of 16 to 18 carbon atom aliphatic alcohols.

Empilan KL10 is a proprietary product prepared by condensing 10 moles of ethylene oxide with 1 mole of a distillation cut of cetyl and oleyl alcohols.

Lubrol AL9 is a proprietary product prepared by condensing 9 moles of ethylene oxide with 1 mole of a distillation cut of oleyl and cetyl alcohols.

I claim:

1. A paste-like polishing composition for stainless steels and the like consisting essentially of water, alumina powder, an aliphatic monohydric alcohol having from 12 to 20 carbon atoms and a waxy condensation product of ethylene oxide and of an aliphatic monohydric alcohol having from 12 to 20 carbon atoms; said alumina powder constituting from about 40 to 50 parts, said aliphatic alcohol constituting from about 7 to 20 parts, said polyoxyethylated alcohol constituting from about 7 to 10 parts, and said water constituting from 27 to 30 parts, all by volume per 100 parts by volume of said composition.

2. A polish according to claim 1 in which the condensation product contains from 3 to 20 moles of ethylene oxide per mole of aliphatic alcohol.

3. A paste-like polishing composition for stainless steels and the like consisting essentially of water, alumina powder, an aliphatic monohydric alcohol having

TABLE III

| Example No. | 10 | 11 | 12 | 13 | 14 | 15 | 16 | 17 | 18 |
|---|---|---|---|---|---|---|---|---|---|
| Alumina powder (parts by volume) | 40 | 50 | 50 | 46 | 46 | 48 | 49 | 49 | 42 |
| Aliphatic alcohol (parts by volume) | 10(a) | 7.5(a) | 10(b) | 20(c) | 8(d) | 6(e) | 7(f) | 7(a) | 15(a) |
| Polyoxyethylated alcohol (parts by volume) | 10(g) | 8(g) | 10(h) | 7(i) | 7(j) | 10(k) | 10(l) | 7(m) | 10(n) |
| Paraffin wax (parts by volume) | 10 | 7.5 | — | — | 11 | 6 | 5 | 10 | 5 |
| Water (parts by volume) | 30 | 27 | 30 | 27 | 28 | 30 | 29 | 27 | 28 |
| Total (parts by volume) | 100 | 100 | 100 | 100 | 100 | 100 | 100 | 100 | 100 |

(a) cetyl alcohol
(b) lauryl alcohol
(c) myristyl alcohol
(d) oleyl alcohol
(e) stearyl alcohol
(f) arachidyl alcohol
(g) Collone AC
(h) Empilan KB3
(i) Empilan KM4
(j) Tergitol nonionic TMN
(k) Empilan KM9
(l) Eumulgin B2
(m) Empilan KL10
(n) Lubrol AL9

Empilan KB3 is a proprietary product prepared by condensing 3 moles of ethylene oxide with 1 mole of lauryl alcohol.

from 12 to 20 carbon atoms, a waxy condensation product of ethylene oxide and of an aliphatic monohydric alcohol having from 12 to 20 carbon atoms, and paraffin wax; said alumina powder constituting from about 40 to 50 parts, said aliphatic alcohol constituting from about 7 to 20 parts, said paraffin wax constituting up to about 10 parts, the total of said aliphatic alcohol and paraffin wax being not more than 20 parts, said polyoxyethylated alcohol constituting from about 7 to 10 parts, and said water constituting from 27 to 30 parts, all by volume, per 100 parts by volume of said composition.

4. A polish according to claim 2 in which the aliphatic alcohol is cetyl alcohol.

5. The polish of claim 1 in which the condensation product is of 6 moles of ethylene oxide and 1 mole of cetyl alcohol.

6. The polish of claim 1 in which the condensation product is of 6 moles of ethylene oxide and 1 mole of cetyl alcohol, and the aliphatic alcohol is cetyl alcohol.

7. A paste-like composition according to claim 3 containing 44% by volume alumina powder, grade A.13, 8% by volume cetyl alcohol, 9.5% by volume paraffin wax, 8% by volume of said condensation product and 30.5% by volume water.

* * * * *